Sept. 16, 1958     F. S. LEMPART     2,852,167
NUT DISPENSING MACHINE

Filed Sept. 23, 1955     2 Sheets-Sheet 1

INVENTOR.
FRANCIS S. LEMPART
BY *Rummler, Rummler & Snow*
ATT'YS

Sept. 16, 1958  F. S. LEMPART  2,852,167
NUT DISPENSING MACHINE
Filed Sept. 23, 1955  2 Sheets-Sheet 2
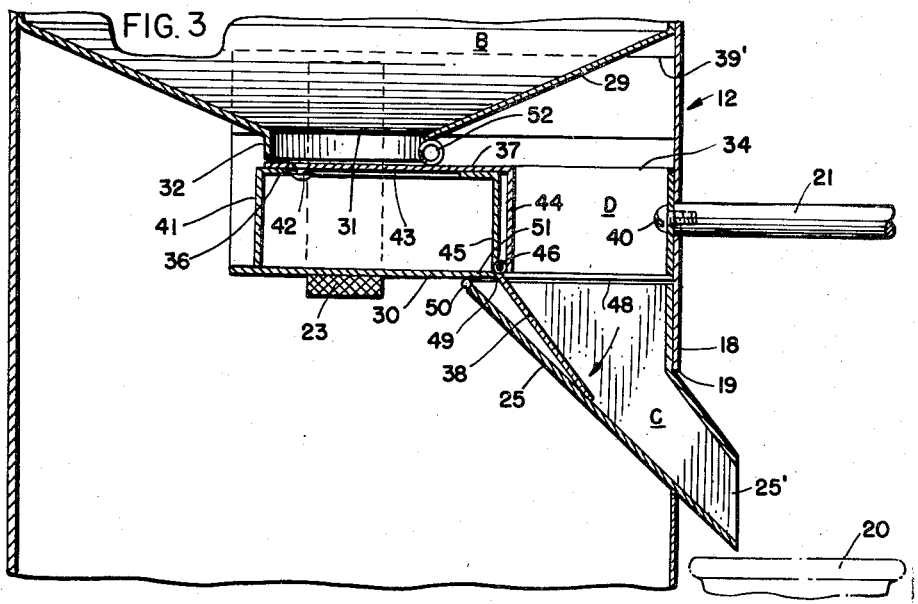
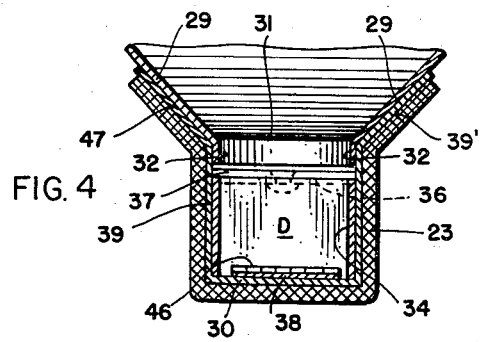
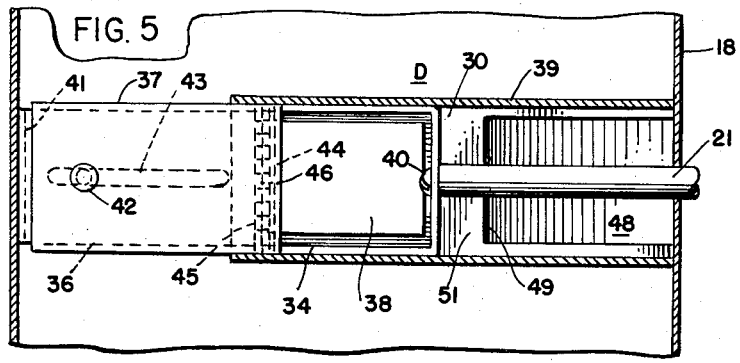
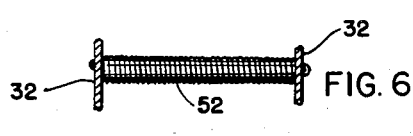
INVENTOR:
FRANCIS S. LEMPART
BY
ATT'YS

United States Patent Office 2,852,167
Patented Sept. 16, 1958

2,852,167

NUT DISPENSING MACHINE

Francis S. Lempart, Chicago, Ill.

Application September 23, 1955, Serial No. 536,108

3 Claims. (Cl. 222—354)

This invention relates to manually-operated and controlled dispensing machines particularly adapted for use in dispensing nuts.

At beverage counters and bars it is quite customary to have nuts available to the patrons to munch with their drinks. Where these are not supplied free by the management they are made available either in coin-dispensing machines or in bags arranged on a counter display for purchase by the patron. Because of the factors of expense, involved in merchandising nuts in either of those ways, the quantities of nuts made available for a small coin are disappointingly meager, at times deterring the beverage patron from making a purchase of nuts, and a possible consequent lessening of the purchases of beverage over what might be done were the nuts more abundant for a small charge.

The main objects of this invention, therefore, are to provide an improved form of coinless, manually-actuated dispensing machine; to provide improved reciprocable merchandise-delivery means having associated elements for measuring the quantity of merchandise to be delivered, for cutting off the supply source of merchandise during the actuation of the measuring-delivery element, and for determining the precise instant of discharge of the merchandise into a delivery chute; to provide improved means for altering the position of the measuring element so as to vary the quantity of merchandise that will be delivered at each operation of the machine; to provide improved resilient means for coacting with the cut-off element for avoiding the crushing of the merchandise during the measuring-delivery operation of the delivery means; and to provide an improved device of this kind which is so simple in the form and arrangement of parts as to make the manufacture thereof extremely economical and particularly suitable for the dispensing of shelled nuts.

In the accompanying drawings:

Fig. 3 is a view similar to Fig. 2 but showing the measuring- and delivery-means in its extended or delivery position.

Fig. 4 is a cross-sectional detail taken on the plane of the line 4—4 of Fig. 2;

Fig. 5 is a fragmentary, sectional plan view taken on the plane of the line 5—5 of Fig. 2; and Fig. 6 is a detail, as viewed from the plane of the line 6—6 of Fig. 2, of the spring for preventing crushing of the nuts during the final forward movement of the measuring- and delivery-means.

Figure 1:
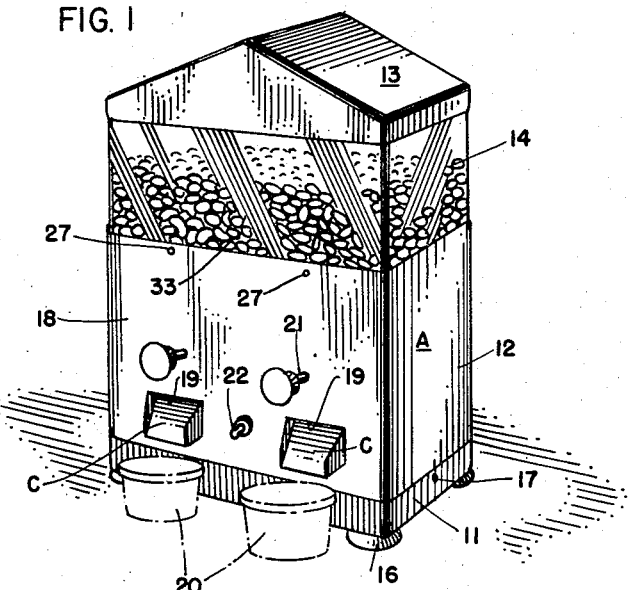
Figure 1 is a perspective view of a nut-dispensing machine constructed in accordance with this invention.
Figure 2:
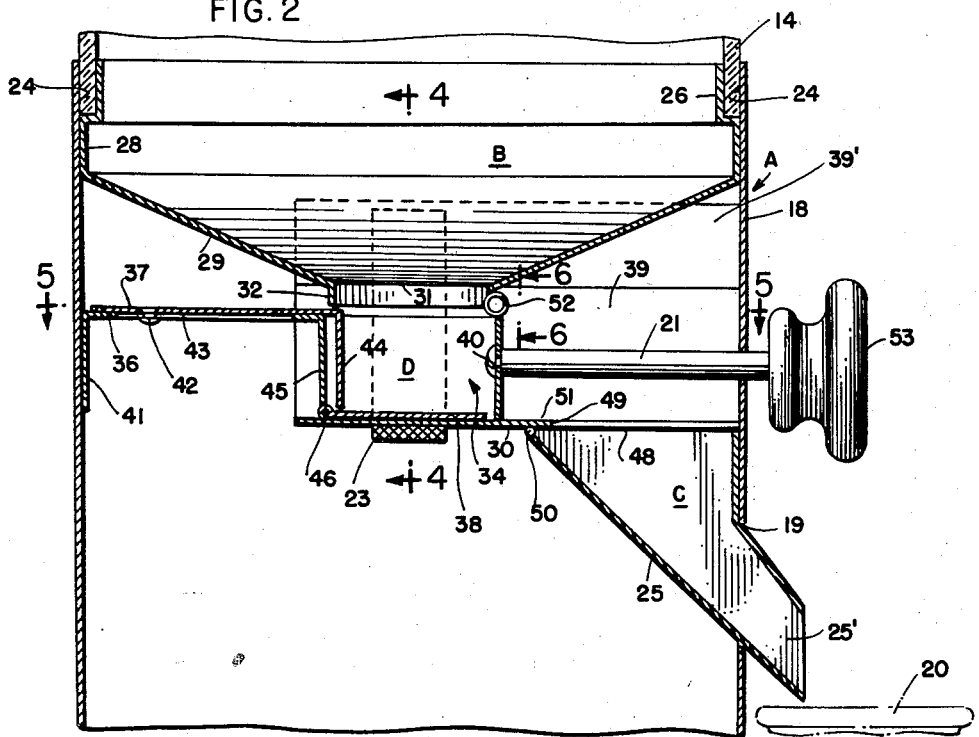
Fig. 2 is an enlarged, fragmentary, transverse, sectional view of the machine shown in Fig. 1, the view being taken on a plane through the right hand portion of the unit, the reciprocating measuring- and delivery-means being shown in its retracted position.

The essential concept of this invention involves one or more merchandise-measuring and -delivery containers manually reciprocable between a retracted position under the open-end of a magazine hopper and an extended merchandise-releasing position over a delivery chute, each container having an adjustable element, for altering the volume capacity of the container and cutting off the supply of merchandise during the delivery operation of the container, and a bottom trap door, releasable only when the container is in its fully-extended delivery position over the chute; a resilient element being arranged to coact with the merchandise cut-off element to avoid crushing the merchandise at the point of final cut-off of the hopper supply.

A nut-dispensing machine embodying the foregoing concept comprises a housing "A" wherein is arranged a magazine hopper "B," one or more dispensing chutes "C," and one or more reciprocatingly mounted adjustable-capacity delivery-means "D."

The housing "A" as herein shown, is of prismatic form comprising a base 11 mounting a vertical enclosure 12 above which a top 13 is supported by an intermediate transparent section 14.

The base 11 is provided with corner projections or feet 16 for supporting the unit on a counter top or table. These may be spherical, cylindrical, or frusto-conical shaped members or they could be conventional vacuum cups.

The vertical enclosure 12 sets on and is suitably secured to the base 11 by means of screws 17 (Fig. 1). The front wall 18, near the base 11, is formed with openings 19 through which ends of the chutes "C" project to deliver the nuts into paper cups 20. Above each opening 19 is an aperture through which extends an operating rod 21 for each of the measuring and delivery-means "D." Between the chute openings 19 is located a switch button 22 for a conventional heating element 23.

The top 13 is here shown of ridge form. It is provided with suitable recesses along the lower perimeters to permit its seating on the upper edges of the intermediate transparent section 14. The top 13 is readily removable to make possible access to the interior of the housing "A" for filling and/or cleaning the hopper "B" and the interior of the housing "A" itself.

The vertical section 12 and the top 13 may be molded or press formed from any suitable material, such as, for example, conventional plastic or light metal. The intermediate transparent section 14 may be plastic or it may be glass. The lower edges of this transparent section 14 seat in recesses 24 around the top perimeter of the vertical enclosure 12. These recesses are formed by an offset flange 26 along the top of the hopper "B." The transparent section 14 is secured in place on the vertical section 12 by screws 27 (Fig. 1).

The hopper "B" is of more or less conventional form. It has a short vertical wall 28 upwardly and inwardly from which extends the flange 26 and downwardly-inwardly from which extends the frusto-conical bottom 29. The bottom 29 terminates in the discharge outlet 31 with its bordering neck or flange 32 centrally disposed in the housing "A" above the measuring and delivery-means "D." Where it is desired to dispense two kinds of nuts from the one hopper, a partition 33 (Fig. 1) is arranged in the hopper "B" to extend up into the transparent section 14 to a point near the top 13.

The chutes "C" are of a more or less conventional form, each having a downwardly-outwardly inclined bottom wall 25 below a platform 30, presently to be described more fully, and a spout 25' extending out through the opening 19 in the front wall 18 of the housing "A" to discharge the nuts into a cup 20.

The measuring-delivery means "D," as herein shown, comprises a pair of rectangular-shaped containers 34 each having a rearward extension 36, on which is adjustably supported a cut-off and volume-regulating plate 37, and a hinged bottom 38.

The containers 34 each are secured to the inner end of the operating rod 21 by a screw 40 so as to slide back and forth on the platform 30 forming a part of a rectangular stirrup 39 dependingly secured to the under side of the frusto-conical bottom 29 of the hopper "B" by means of outwardly flaring wing portions 39'.

Each extension 36 is integral with the respective container 34 and has a depending flange 41 at its rear end spaced from the back wall of the container 34 a distance such that upon abutting the rear wall of the housing vertical enclosure 12 the respective container 34 is appropriately disposed below the hopper outlet 31 in registry therewith to receive a quantity of nuts.

The cut-off and volume-regulating plate 37 is of substantially the same width as the container 34 and is secured on the top wall of the respective extension 36 by rivet or screw 42 slidable in and along a fore-and-aft slot 43 in the extension 36. At its forward end each cut-off plate 37 is formed with a flange-like end plate 44 which extends downwardly into the respective container 34 forwardly of and parallel with the rear wall 45 of the container. Thus, by adjusting the plate 37 on the extension 36 the volume capacity of the container 34 may be regulated to vary the quantity of nuts that are to be dispensed at each reciprocation of the container 34.

The bottom 38, for each container 34, is hinged at 46 along its rear edge to the lower edge of the container back wall 45. The bottom 38 is slightly less in length and width than the inside dimensions of the container 34 so that it can swing freely, as a trap door, in and out of alinement with the bottom edges of the vertical walls of the respective container 34, when the container 34 is moved back and forth over the respective chute "C."

The stirrup 39 is somewhat Y-shaped, as is most apparent from Fig. 4. The wings 39', being suitably secured to the sloping under sides of the hopper bottom 29 and extending forwardly to the front wall 18 of the housing "A," dispose the platform 30 below the hopper opening 31 in a plane directly above the chute opening 48. The forward portion of this platform 30, which would otherwise overhang the chute opening 48, is cut away to a point slightly forward of the rear part of the chute opening so as to dispose the advance edge 49 of the platform 30 forwardly of the upper rear end 50 of the chute bottom 25 and provide a short overhanging portion 51. Such positioning of the advance platform edge 49 and the overhang 51 results in retaining the hinged container bottom 38 in its normally-closed, horizontal position until the forward end of the measuring slide 37 on the advancing container 34 has passed well beyond the cut-off point 52 and has fully closed the opening 31 of the hopper "B." This results in dropping of the hinged bottom 38 only after the container has substantially reached its fully-extended position, and a consequent instant dumping of the container contents into the chute "C" without any possibility of there ever being a continuous open passage between the hopper "B" and the chute "C."

A helically coiled cut-off spring 52 extends across the forward end of the hopper opening 31 between the side flanges 32 thereof. It is thus positioned to contact the advancing edge of the adjustment plate 37 and serve as a resilient scraper and cut-off element. Because this spring can yield, when contacted by projecting portions of the hopper contents at this point, the crushing or breaking of nuts at the cut-off point is nearly, if not completely, obviated.

As shown the heater 23 is of the electric strip type and is disposed so as to extend across the bottom and up along the opposite sides of the stirrup 39 directly below the hopper outlet 31. Also the ends of the heater strip are preferably extended upwardly across the stirrup wing 39'. The function of the heater 23 is to provide sufficient heat to keep the nuts warm, both in the delivery container 34 and in the main supply hopper "B," so that the nuts will remain dry and not become stale by the absorption of moisture while standing in the dispensing machine. Not only does this assure freshness for the nuts dispensed, even though several days may pass before the hopper supply is replenished, but also makes the nuts more tasty and pleasing to the customer when served to him while still warm.

Preferably the heater strip 23 is formed to fit and hug the outer walls of the stirrup 39—39', for greater efficiency of heat transfer and, while mounting means for the heater are not shown, it will be understood that any suitable means such as screws at the heater ends, may be employed to secure the heater strip firmly in place.

The operation of this nut-dispensing device is believed to be quite obvious from the foregoing description. Suffice to observe here briefly, however, the essential sequence.

With the hopper "B" containing a quantity of nuts of the desired kind, each container 34, in its fully-retracted position, will be filled to the brim with the nuts. When an operator grips one of the handles 53 and pulls the rod 21 outwardly, the plate 37 is drawn across the hopper bottom opening 31 and beneath the scraper spring 52 to cut off the supply of nuts to the respective container 34.

As the container 34 approaches its full-extended position the spring 52 coacts with the advancing edge of the cut-off plate 37 and slightly yields as may be necessary to pass jammed nuts so as to very greatly reduce if not completely eliminate the crushing of nuts, as the hopper supply is finally cut off from the container 34.

During the advance of the container 34, the hinged bottom 38 thereof rides on the advance portion 51 of the platform 30 and holds the nuts in the container until the leading end of the adjustment plate 37 has passed the cut-off spring 52 and up to the very moment that the container 34 is just about to complete its advancing movement. As the container then moves into its completely advanced position the hinge 46 on the bottom 38 moves into registration with the forward edge 49 of the platform extension 51 and thereupon the bottom 38 is released and drops into the chute "C" to instantly dump its entire contents into the chute for discharge into a cup 20.

Obviously by adjusting the plate 37 along the rearward extension 36 of the delivery means "D," as permitted by the screw 42 and slot 43, the flange-like end wall 44 may be positioned as desired in the respective container 34 to regulate the volume capacity of the container and thereby adjust the quantity to be delivered at each operation.

The main advantages of this invention reside in the simplicity of its construction and its resultant low manufacturing cost, as well as in the certainty of the measure of the delivered goods; in the simplicity of its operation; its fool proof assembly; and in the ease of its maintenance in regard to cleanliness and operability. Other advantages are to be found in the improved cut-off arrangement whereby it is impossible to deliver any more than a precisely measured quantity of goods; and in the arrangement whereby breakage and crushing of the goods during dispensing is substantially eliminated.

Although but one specific embodiment of this invention is herein shown and described it will be understood that numerous details of the construction shown may be altered or omitted without departing from the spirit of the invention as defined by the following claims.

I claim:

1. A dispensing machine comprising, a housing, a hopper arranged in the housing with a bottom discharge opening spaced rearwardly from the front housing wall, a chute having a receiving opening spaced below and forwardly of the hopper opening, an open-top delivery container mounted to reciprocate between a retracted position under the hopper opening and an extended position over the chute opening, a rearwardly hinged bottom on the container adapted to swing freely downward and discharge the container contents by gravity into the chute, rearwardly extending platform means having its forward edge overhanging the rear of the chute opening for slidably supporting said container and the hinged bottom thereof and controlling the release of the hinged bottom from and the return thereof to its normal container closing position upon reciprocation of said container, a rearwardly extending plate on said container mounted at the top rear end thereof for movement across the hopper opening to cut off the contents thereof from the container during its forward shifting movement, and a helically coiled spring extending across the forward edge of the hopper opening transverse the path of said container and coacting with the advancing edge of the said plate to obviate the crushing of hopper merchandise as it is cut off from the container by the spring and plate, said spring being disposed a predetermined distance to the rear of the forward edge of said platform whereby said plate will fully close the hopper discharge opening a predetermined interval in advance of the release of said hinged bottom by the forward edge of said platform.

2. A dispensing machine comprising, a housing, a hopper arranged in the housing with a bottom discharge opening spaced from one housing wall, a chute having a receiving opening spaced below and at one side of the hopper opening, an open-top delivery container mounted to reciprocate horizontally between a retracted position under the hopper opening and an extended position over the chute opening, a cut-off plate at the rear of said container and extending horizontally rearward therefrom, a normally closed hinged bottom on the container adapted to swing downwardly by gravity to discharge the container contents gravitationally into the chute, a resilient cut-off means extending along the forward edge of the hopper opening and coacting with said cut-off plate, and platform means contiguous to the rear of the chute opening and normally engaging said hinged bottom for controlling the release of the hinged bottom from and the return thereof to its normal container closing position, said resilient cut-off means being spaced rearwardly of said last means a predetermined distance such that said cut-off plate will close said discharge opening a predetermined interval prior to downward release of said hinged bottom by said platform means.

3. A dispensing machine comprising, a housing, a hopper arranged in the housing with a bottom discharge opening spaced from one housing wall, a chute having a receiving opening spaced below and at one side of the hopper opening, a horizontal platform extending from below the hopper opening forwardly into the rear of the chute opening, an open-top container mounted to slide back and forth on the platform between a retracted position under the hopper opening and an extending position over the chute opening, a cut-off plate extending rearwardly from the rear top edge of said container, and a normally closed container bottom hinged along its rear edge to the rear of the container and resting gravitationally on said platform, resilient cut-off means extending horizontally across the forward edge of said discharge opening, the container bottom being releasable by the forward edge of the platform to drop gravitationally into the chute opening when the container reaches approximately its fully-extended position and the rear of the container is registered with said forward edge of said platform, the forward edge of the platform being spaced forwardly of said resilient cut-off means a predetermined distance such that said cutoff plate will close said hopper discharge opening a predetermined interval prior to downward release of said hinged bottom.

References Cited in the file of this patent

UNITED STATES PATENTS

| 697,510 | Mattox | Apr. 15, 1902 |
| 895,516 | Tucker | Aug. 11, 1908 |
| 1,295,540 | McCaig et al. | Feb. 25, 1919 |
| 2,644,614 | Tanko et al. | July 7, 1953 |

FOREIGN PATENTS

| 8,162 | Great Britain | Mar. 4, 1909 |
| 170,900 | Great Britain | Oct. 31, 1921 |